United States Patent
Gay et al.

(10) Patent No.: US 9,466,148 B2
(45) Date of Patent: Oct. 11, 2016

(54) SYSTEMS AND METHODS TO DYNAMICALLY ADJUST AN IMAGE ON A DISPLAY MONITOR REPRESENTED IN A VIDEO FEED

(75) Inventors: Michael F. Gay, Burbank, CA (US); Lawrence Jones, Burbank, CA (US); Michael Zigmont, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 496 days.

(21) Appl. No.: 12/875,781

(22) Filed: Sep. 3, 2010

(65) Prior Publication Data
US 2012/0056980 A1    Mar. 8, 2012

(51) Int. Cl.
| H04N 13/00 | (2006.01) |
| H04N 5/262 | (2006.01) |
| H04N 5/228 | (2006.01) |
| G06T 15/20 | (2011.01) |
| H04N 13/04 | (2006.01) |

(52) U.S. Cl.
CPC ......... G06T 15/205 (2013.01); H04N 13/0468 (2013.01); H04N 2213/006 (2013.01)

(58) Field of Classification Search
None
See application file for complete search history.

(56) References Cited

U.S. PATENT DOCUMENTS

| 5,528,263 A * | 6/1996 | Platzker et al. ............... 345/156 |
| 6,373,961 B1 * | 4/2002 | Richardson et al. ......... 382/103 |
| 6,416,476 B1 * | 7/2002 | Ogasawara et al. .......... 600/443 |
| 7,098,868 B2 * | 8/2006 | Love et al. .................... 345/1.1 |
| 2001/0024239 A1 * | 9/2001 | Feder et al. ................ 348/423.1 |
| 2002/0056120 A1 * | 5/2002 | McTernan et al. ............. 725/87 |
| 2002/0157105 A1 * | 10/2002 | Vienneau et al. ............. 725/105 |
| 2005/0185058 A1 * | 8/2005 | Sablak ...................... 348/208.99 |
| 2006/0038833 A1 * | 2/2006 | Mallinson et al. ........... 345/633 |
| 2006/0210254 A1 * | 9/2006 | Yamashita et al. ........... 386/117 |
| 2006/0230332 A1 * | 10/2006 | Lin ............................. 715/500.1 |
| 2008/0012850 A1 * | 1/2008 | Keating, III .................. 345/419 |
| 2008/0062164 A1 * | 3/2008 | Bassi et al. .................... 345/214 |
| 2008/0068372 A1 * | 3/2008 | Krah .............................. 345/419 |
| 2008/0309755 A1 * | 12/2008 | Yoshida et al. ................. 348/51 |
| 2010/0060581 A1 * | 3/2010 | Moore et al. ................. 345/163 |
| 2010/0201790 A1 * | 8/2010 | Son et al. ........................ 348/53 |

FOREIGN PATENT DOCUMENTS

WO    WO 2008/053200    *    5/2008

OTHER PUBLICATIONS

CG4TV, "Virtual Newsroom for Two Hosts", Mar. 22 2010, http://www.cg4tv.com/virtualset/green-screen-backgrounds/virtual-newsroom-for-two-hosts.html.*

* cited by examiner

*Primary Examiner* — Frederick Bailey
(74) *Attorney, Agent, or Firm* — McCormick, Paulding & Huber LLP

(57) ABSTRACT

According to some embodiments, information about dynamic adjustments being made to a video feed may be received from an instrumented video camera, the video feed including a representation of a display monitor. An image to be displayed on the display monitor represented in the video feed may also be received. The image to be displayed on the display monitor may then be automatically adjusted based on the information received about dynamic adjustments to the video feed. The adjusted image may then be output to the display monitor.

30 Claims, 7 Drawing Sheets

SYSTEMS AND METHODS TO DYNAMICALLY ADJUST AN IMAGE ON A DISPLAY MONITOR REPRESENTED IN A VIDEO FEED

FIELD

The present invention relates to systems and methods wherein a display monitor is represented in a video feed. Some embodiments relate to systems and methods to efficiently and dynamically adjust an image on a display monitor represented in a video feed.

BACKGROUND

A broadcast program might include a representation of a display monitor. For example, a video camera in a studio might be pointed at a news anchor seated at a desk and a television monitor might be placed on the desk facing the video camera. The television monitor might display a sports score, scrolling news headlines, the name and/or logo of the television show being broadcast, or any other still or moving image. In this way, the video camera will generate a video feed (e.g., a video feed to be broadcast to viewers) that includes representations of the news anchor, the desk, and the television monitor (as well the image that is displayed by the television monitor). Since the image displayed on the television monitor is two-dimensional (e.g., as defined by the flat surface of the monitor's screen), it will appear flat to viewers watching the program being broadcast. This will be true even when the video camera dynamically moves around the studio. Such a graphical display, however, may be uninteresting to viewers.

DETAILED DESCRIPTION

Figure 1:
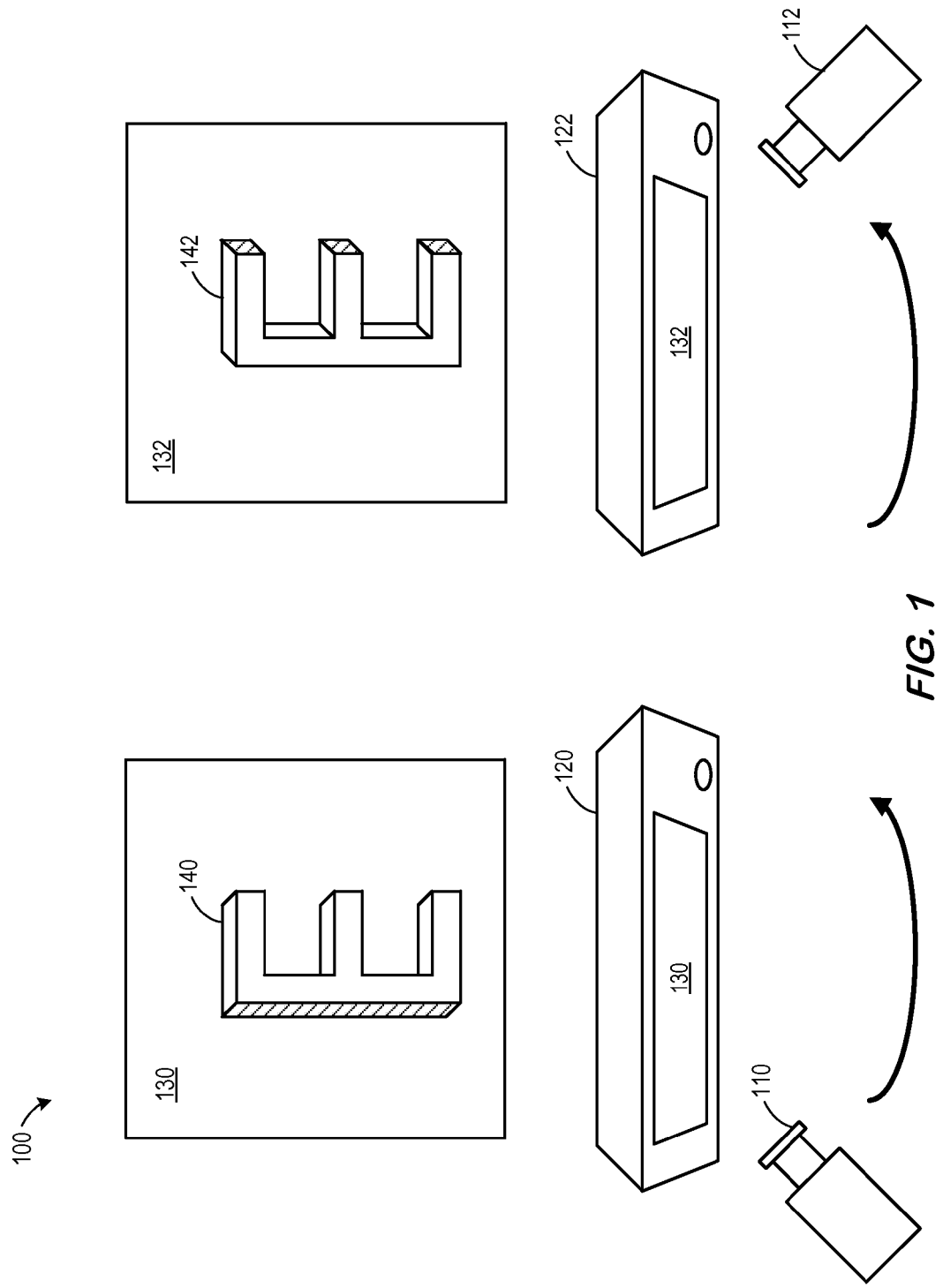
FIG. 1 is an illustration of a system in accordance with some embodiments.

Applicants have recognized that there is a need for methods, systems, apparatus, means and computer program products to efficiently and dynamically adjust an image on a display monitor represented in a video feed. Consider, for example, FIG. 1 which illustrates a system 100 wherein a video camera 110 is pointed at a set that includes a display monitor 120. The display monitor 120 might be, for example, a vacuum tube monitor, a Liquid Crystal Display (LCD) monitor, a plasma monitor, or any other type of television or similar device that can display a still or moving image on a substantially flat surface or screen 130. In some cases, the video camera 110 might be in a studio an may also be pointed at a news anchor seated at a desk (not illustrated in FIG. 1). In this case, the display monitor 120 might be placed on or behind the desk and face the video camera 110. The display monitor 120 might display a sports score, scrolling news headlines, the name and/or logo of the television show being broadcast, or any other still or moving image on the screen 130. In this way, the video camera 110 will generate a video feed (e.g., a video feed to be broadcast to viewers) that includes representations of the news anchor, the desk, and the display monitor 120 (as well the image that is displayed on the screen 130 of the display monitor 120). Since the image displayed on the screen 130 display monitor 120 is two-dimensional (e.g., as defined by the flat surface of the monitor's screen 130), it may appear flat to viewers watching the program being broadcast. This will be true even when the video camera 110 dynamically moves around the studio. Such a graphical display, however, may be uninteresting to viewers.

According to some embodiments of the present invention, information about dynamic adjustments being made video camera 110 (e.g., the fact that the video camera 110 is moving as indicated by the arrow in FIG. 1) may be used to automatically adjust the image that is provided to and displayed on the screen of the display monitor 130. For example, the adjusted image on the screen 130 may create an impression or illusion to a viewer of the video feed created by the video camera 110 that the image displayed on the display monitor 120 occupies a three dimensional physical space.

Consider for example the letter "E" 140 illustrated in FIG. 1. Because the camera 110 is initially positioned to the left side of the display monitor 120, the image on the screen 130 may be adjusted to show the shaded area illustrated in the FIG. Now consider the situation when a camera 112 is positioned on the right side if a display monitor 122. In this case, a screen 132 of the display monitor 122 might display an altered letter "E" 142 to show the shaded area illustrated in FIG. 1. In this way, movement of the camera 110 combined with adjustments to the image may create an impression to a viewer that the letter "E" occupies a three dimensional physical space (as it is adjusted from the first altered image 140 to the second altered image 142).

Figure 2:
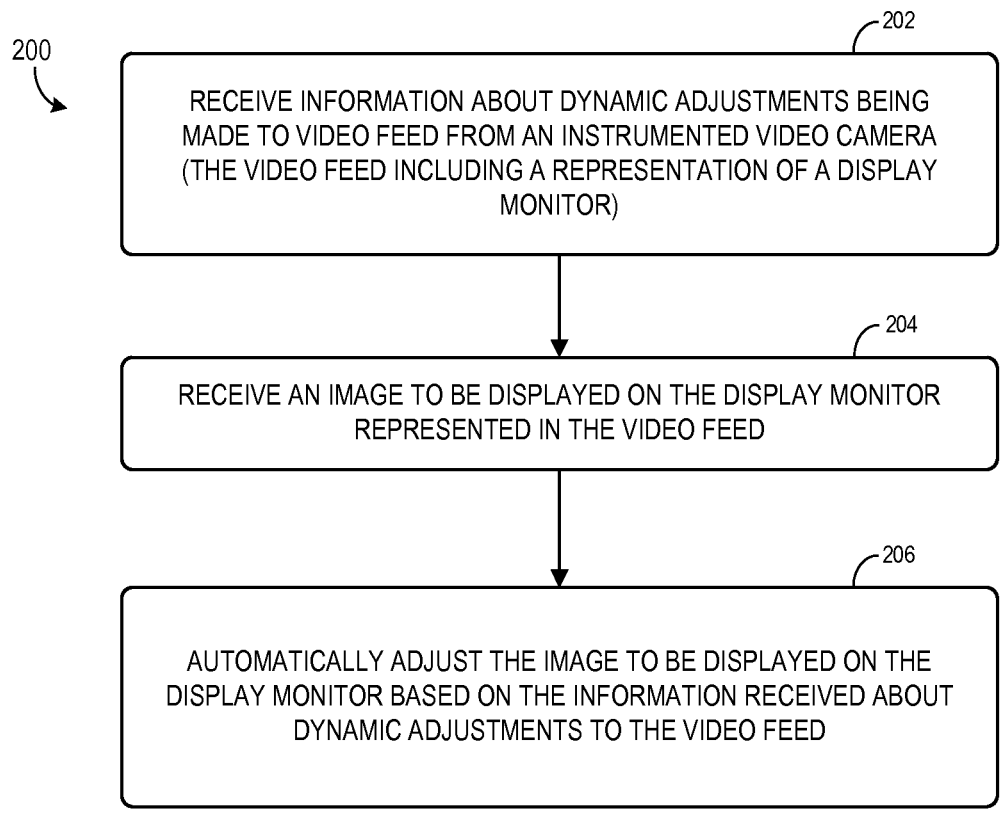
FIG. 2 is a flow chart of a method in accordance with some embodiments of the present invention.

FIG. 2 illustrates a method that might be performed, for example, by some or all of the elements described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, information may be received about dynamic adjustments being made to a video feed from an instrumented video camera, the video feed including a representation of a display monitor. The instrumented video camera may be adapted to provide substantially real-time information about the dynamic adjustments made to the instrumented video camera, such as a panning motion, a tilting motion, a focal change, and/or a zooming adjustment.

At 204, an image to be displayed on the display monitor represented in the video feed may be received. The received image might be a still or moving image such as a sports score, scrolling news headlines, or the name and/or logo of the television show being broadcast.

At 206, the image to be displayed on the display monitor may be automatically adjusted based on the information received about dynamic adjustments to the video feed. The adjusted image may, for example, create an impression to a viewer of the video feed that the image displayed on the display monitor occupies a three dimensional physical space. The adjusted image may then be output to the display monitor. In this way, adjusted image will thus become part of the video feed created by the video camera. According to some embodiments, the video feed is automatically adjusted by a real time rendering platform, based on the dynamic adjustments made to an instrumented video camera, to create an impression to a viewer that the image displayed on the display monitor occupies a three dimensional physical space.

As used herein, the phrases "video feed" and "received image" may refer to any signal conveying information about a moving or still image, such as a High Definition-Serial Data Interface ("HD-SDI") signal transmitted in accordance with the Society of Motion Picture and Television Engineers 292M standard. Although HD signals may be described in some examples presented herein, note that embodiments may be associated with any other type of video feed, including a standard broadcast feed and/or a 3D image feed. Moreover, video feeds and/or received images might comprise, for example, an HD-SDI signal exchanged through a fiber cable and/or a satellite transmission.

Note that the instrumented video camera may be any device capable of generating a video feed, such as a Vinten® studio (or outside) broadcast camera with a pan and tilt head. According to some embodiments, at least one of the local video camera and the remote video camera are an "instrumented" video camera adapted to provide substantially real-time information about dynamic adjustments being made to the instrumented video camera. As used herein, the phrase "dynamic adjustments" might refer to, for example, a panning motion, a tilting motion, a focal change, and/or a zooming adjustment being made to a video camera (e.g., zooming the camera in or out).

Figure 3:
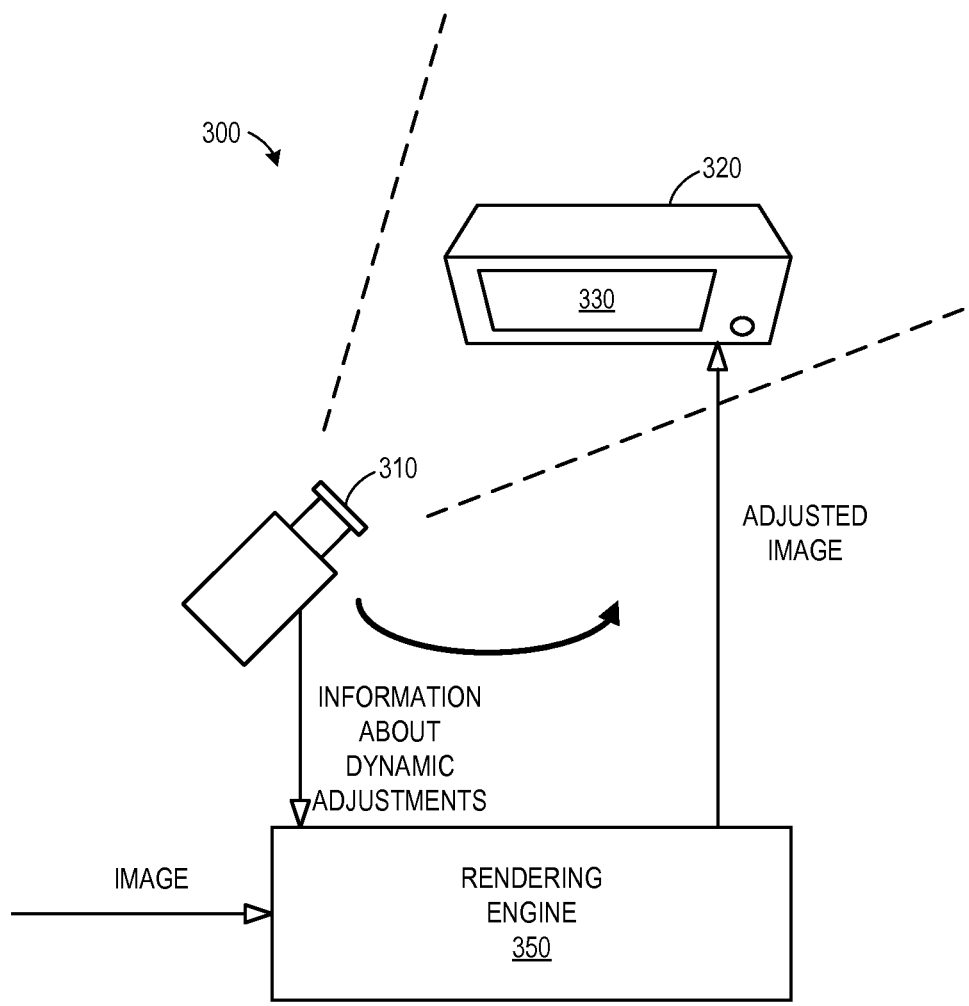
FIG. 3 is a block diagram of a system in accordance with some embodiments of the present invention.

FIG. 3 is a block diagram of a system 300 in accordance with some embodiments of the present invention. The system 300 includes a video camera 310 aimed at a display monitor 320. The video camera 310 might comprise, for example, an instrumented hard camera that can be dynamically adjusted (e.g., via pan and/or tilt motions). The video camera 310 might provide information about such dynamic adjustments directly to a rending engine 350 via a serial interface and/or linked fiber transceivers. The rending engine 350 may execute a rendering application, such as the Brainstorm eStudio® 3D real-time graphics software package. Note that the rendering platform could be implemented using a Personal Computer (PC) running a Windows® Operating System ("OS") or an Apple® computing platform.

The rendering engine 350 further receives an image (or information about the image) to be displayed on a screen 330 of the display monitor 320. According to some embodiments, the rendering engine 350 generates the image (instead of receiving the image from another device). The rending engine 350 may then automatically adjust the image based on information about dynamic adjustments received from the video camera 310 (e.g., the image of a logo may be adjusted when the studio camera is tilted). The adjusted image may then be provided from the rendering engine 350 to the display monitor 320 (e.g., as an HD-SDI feed). The display monitor 320 produces the altered image on the screen 330 which in turn is captured and output by the video camera 310 as a video feed. The resulting output video feed from the video camera 310 therefore creates an impression that image on the screen 330 is three dimensional. According to some examples, information may be mapped to a tracked plane in a virtual environment and/or the tracked plane of video may be keyed over an encoded and delayed feed a camera (e.g., equipped with an encoded jib associated with a virtual setup) by a switcher using a chroma keyer to complete the effect. Note that the an operator of the video camera 310 might provide to the rendering software information about the distance between his or her camera to the display monitor 320 and/or help calibrate the field of view.

In some examples described herein, a display monitor is provided as a physical display monitor having a screen. Note, however, that a display monitor could, according to some embodiments, comprise a "virtual" display monitor that is not physically present in the studio (or other location). Consider, for example, FIG. 4 which is a block diagram of a system 400 in accordance with another embodiment. As before, the system 400 includes a video camera 410. The video camera 410 might comprise, for example, an instrumented hard camera that can be dynamically adjusted (e.g., via pan and/or tilt motions). The video camera 410 might provide information about such dynamic adjustments directly to a rending engine 450 via a serial interface and/or linked fiber transceivers. In this example, the video camera 410 also provides a video feed to the rendering engine 450. The rending engine 450 may execute a rendering application, such as the Brainstorm eStudio® 3D real-time graphics software package.

The rendering engine 450 further receives an image (or information about the image) to be displayed on a screen 430 of a virtual display monitor 420. According to some embodiments, the rendering engine 450 generates the image (instead of receiving the image from another device). That is, the rendering engine 450 generates a representation of the virtual display monitor 420, including a virtual screen 430, and inserts that representation into video feed received from the video camera 410. Moreover, according to this embodiment the rendering engine 450 automatically adjusts the received image based on information about dynamic adjustments received from the video camera 410 (e.g., the image of a logo may be adjusted when the studio camera is tilted). The adjusted image may then be provided via the virtual screen 430. The resulting output video feed from the rendering engine 450 therefore may create an impression that image on the virtual screen 430 is three dimensional.

Figure 4:
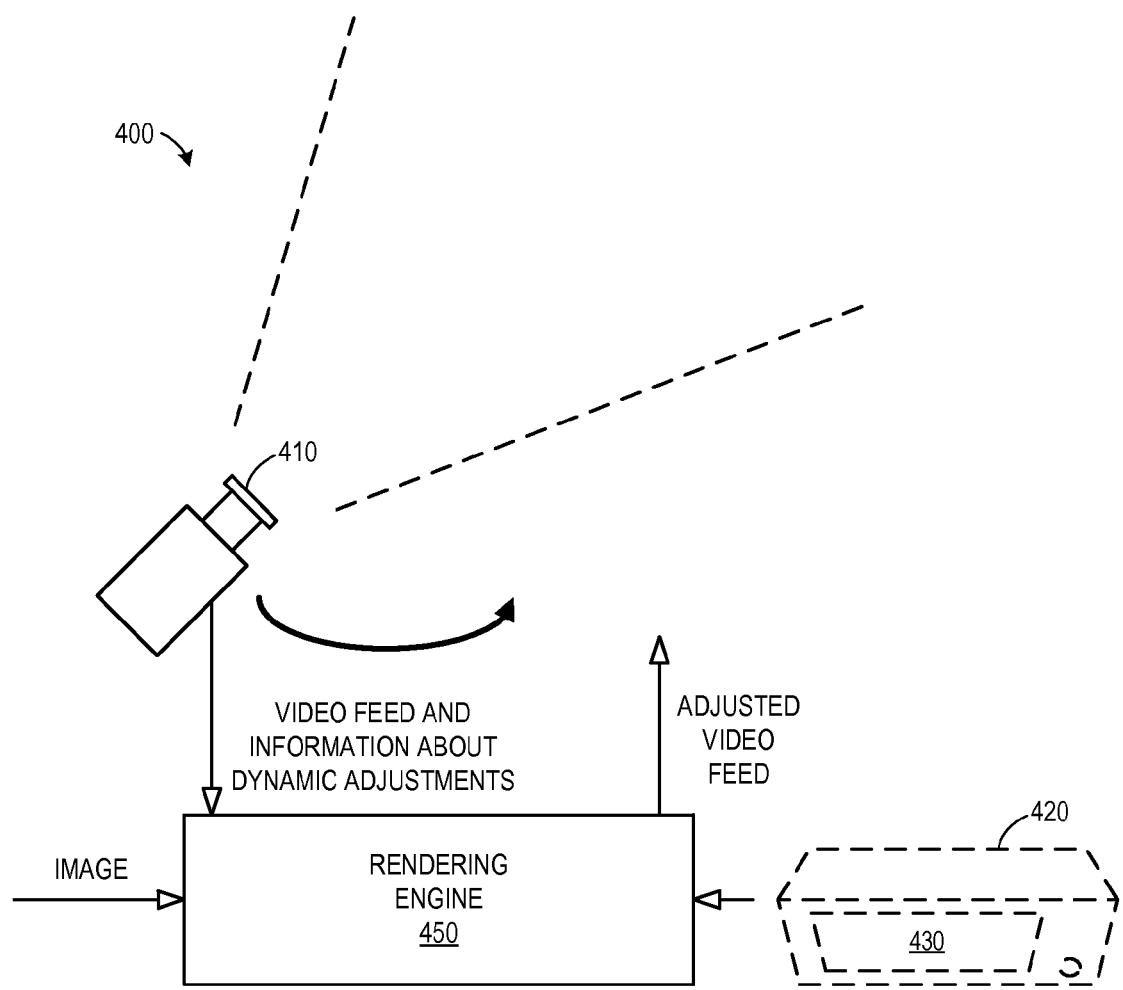
FIG. 4 is an illustration of a system in accordance with another embodiment.
Figure 5:
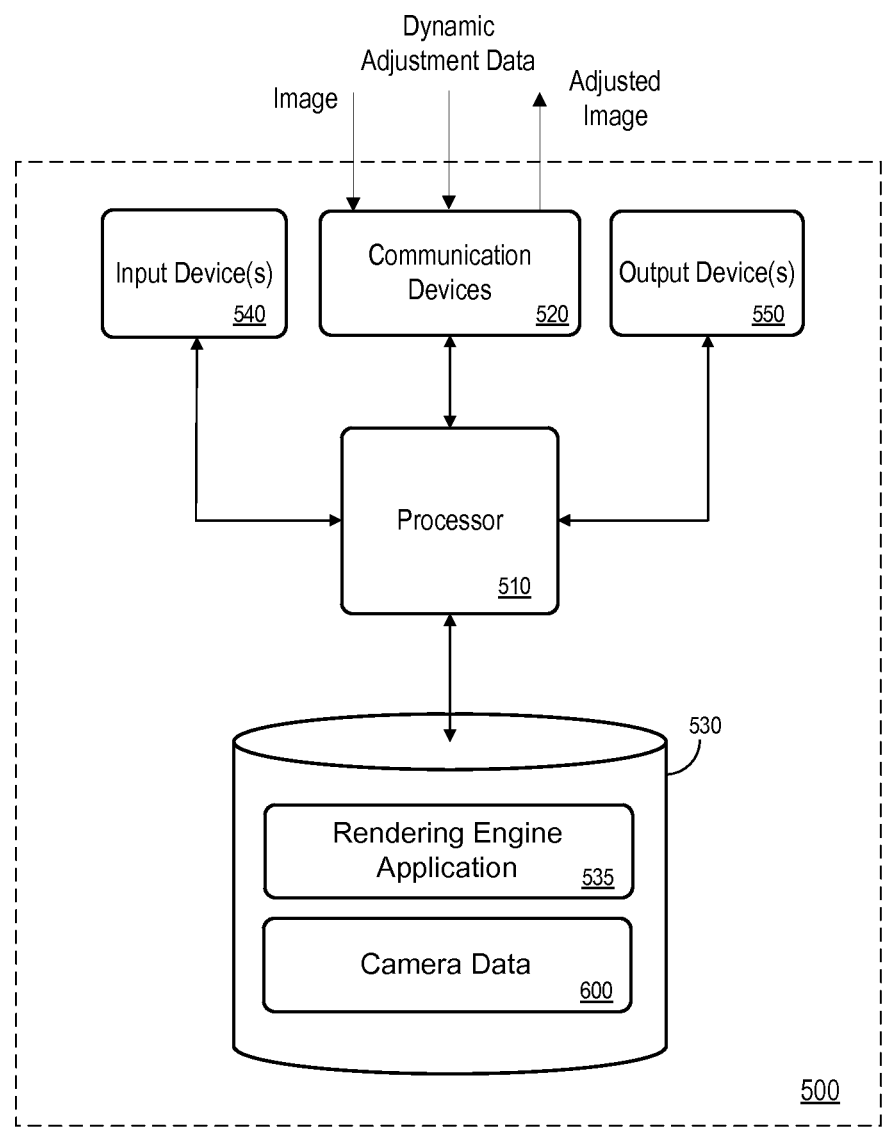
FIG. 5 is a block diagram of a rendering engine in accordance with some embodiments of the present invention.

FIG. 5 is a block diagram of a rendering engine 500 that might be associated with, for example, the system 300 of FIG. 3 and/or the system 400 of FIG. 4 in accordance with some embodiments of the present invention. The rendering engine 500 comprises a processor 510, such as one or more INTEL® Pentium® processors, coupled to communication devices 520 configured to communicate with remote devices (not shown in FIG. 5). The communication devices 520 may be used, for example, to receive a video feed and/or dynamic adjustment information about a video camera and/or to transmit an adjusted image to a display monitor (and/or an adjusted video feed to be broadcast in the case of a virtual monitor).

The processor 510 is also in communication with an input device 540. The input device 540 may comprise, for example, a keyboard, a mouse, or computer media reader. Such an input device 540 may be used, for example, to enter information about a remote and/or studio camera set-up. The processor 510 is also in communication with an output device 550. The output device 550 may comprise, for example, a display screen or printer. Such an output device 550 may be used, for example, to provide information about a studio camera set-up to an operator.

The processor 510 is also in communication with a storage device 530. The storage device 530 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 530 stores a rendering engine application 535 for controlling the processor 510. The processor 510 performs instructions of the application 535, and thereby operates in accordance any embodiments of the present invention described herein. For example, the processor 510 may receive information about dynamic adjustments being made to a video feed rom an instrumented video camera, the video feed including a representation of a display monitor. An image to be displayed on the display monitor represented in the video feed may also be received by the processor 510. The image to be displayed on the display monitor may then be automatically adjusted by the processor 510 based on the information received about dynamic adjustments to the video feed. The adjusted image may then be output by the processor 510 to the display monitor.

As used herein, information may be "received" by or "transmitted" to, for example: (i) the rendering engine 500 from other devices; or (ii) a software application or module within rendering engine 500 from another software application, module, or any other source.

As shown in FIG. 5, the storage device 530 also stores camera data 600. One example of such a database 600 that may be used in connection with the rendering engine 500 will now be described in detail with respect to FIG. 6. The illustration and accompanying descriptions of the database presented herein are exemplary, and any number of other database arrangements could be employed besides those suggested by the figures.

Figure 6:
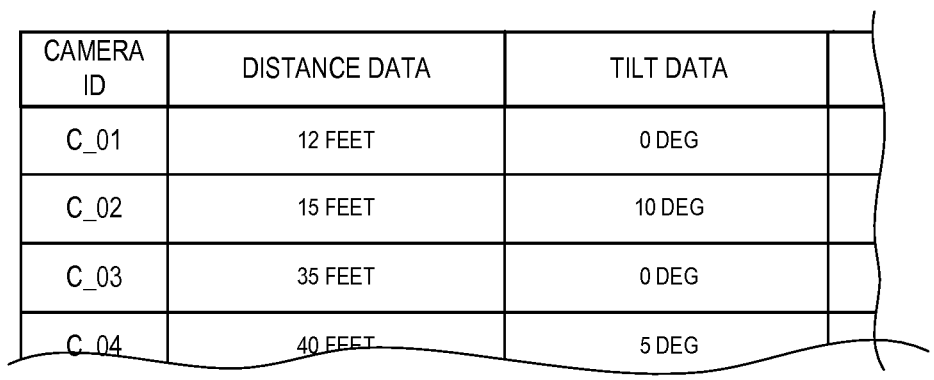
FIG. 6 is a tabular representation of a portion of a camera data table in accordance with some embodiments of the present invention.

FIG. 6 is a tabular representation of a portion of a camera data table 600 in accordance with some embodiments of the present invention. The table 600 includes entries associated with different video cameras. The table 600 also defines fields for each of the entries. The fields might specify a camera identifier, a distance between a camera and a monitor, tilt data, zoom data, focus data, field of view data, etc. The information in the database 600 may be periodically created and updated based on information received from, for example, camera operators and/or instrumented video cameras. Note that in the embodiment described with respect to FIG. 3, a table 600 associated with only a single video camera might be needed by the rendering engine.

Figure 7:
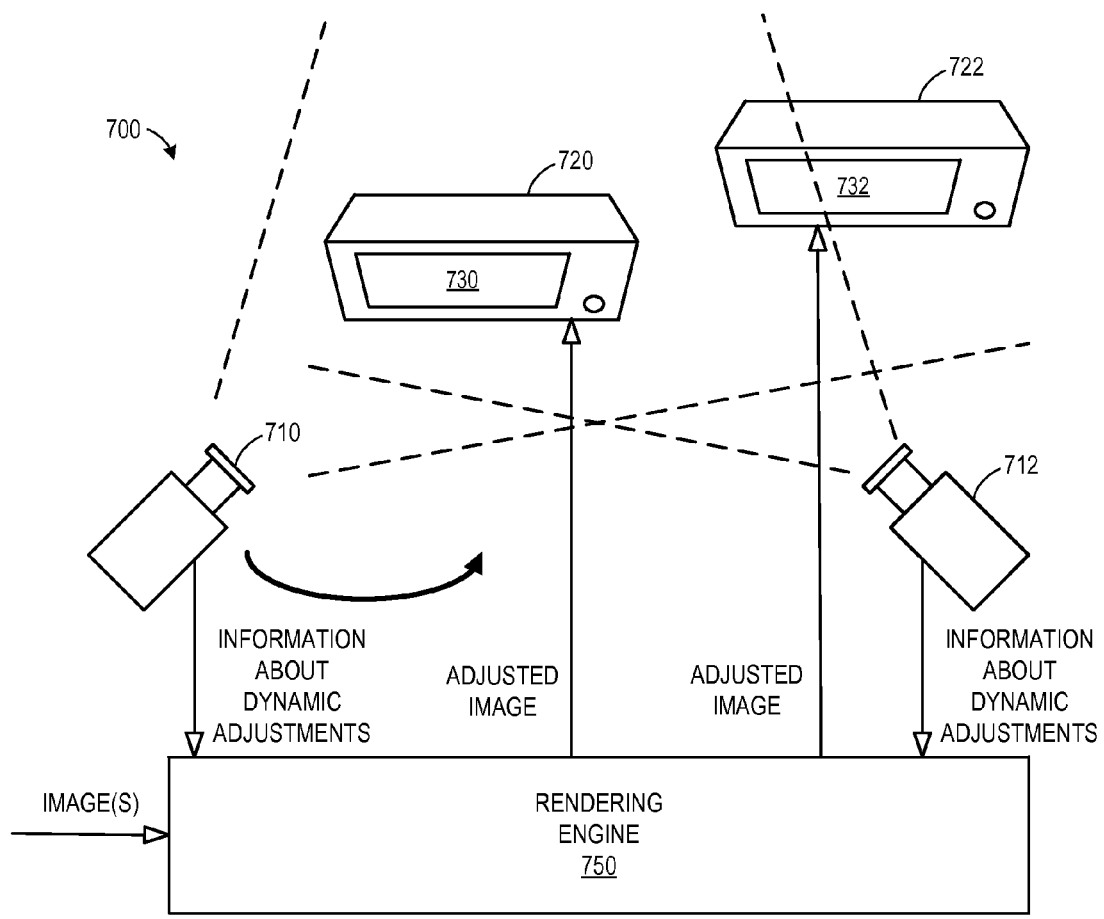
FIG. 7 is an illustration of a system in accordance with another embodiment.

FIG. 7 is a block diagram of a system 700 in accordance with some embodiments of the present invention. The system 700 includes a video camera 710 aimed at a first display monitor 720 and a second display monitor 722. The video camera 710 might comprise, for example, an instrumented hard camera that can be dynamically adjusted (e.g., via pan and/or tilt motions). The video camera 710 might provide information about such dynamic adjustments directly to a rending engine 750 via a serial interface and/or linked fiber transceivers. The rending engine 750 may execute a rendering application, such as the Brainstorm eStudio® 3D real-time graphics software package.

The rendering engine 750 further receives one or more images (or information about the images) including an image to be displayed on a screen 730 of the display monitor 720. According to some embodiments, the rendering engine 750 generates the image (instead of receiving the image from another device). The rending engine 750 may then automatically adjust the image based on information about dynamic adjustments received from the video camera 710 (e.g., the image of a logo may be adjusted when the studio camera is tilted). The adjusted image may then be provided from the rendering engine 750 to the display monitor 720 (e.g., as an HD-SDI feed). The display monitor 720 produces the altered image on the screen 730 which in turn is captured and output by the video camera 710 as a video feed. The resulting output video feed from the video camera 710 therefore creates an impression that image on the screen 730 is three dimensional.

According to this embodiment, the video camera is also aimed at some or all of a second video monitor 722. Moreover, the rending engine 750 may adjust an image to be displayed on a screen 732 of the second display monitor 722. Note that the original image may be the same as (or different than) the image processed for the first display monitor 720. Moreover, according to this embodiment, a second video camera 712 is also aimed at the two display monitors 720, 722. The rendering engine 750 may further process images based on information received from the second video camera 712 (e.g., a first adjustment might be made when the first video camera 710 is the current active camera and a second adjustment might be made when the second video camera 712 is the current active camera).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although three dimensional effects have been described in some of the examples presented herein, note that other video effects might be incorporated in addition to (or instead of) three dimensional effects) in accordance with the present invention. Moreover, although specific hardware and data configurations have been described herein, note that any number of other configurations may be provided in accordance with embodiments of the present invention (e.g., some of the information associated with the databases and engines described herein may be split, combined, and/or handled by external systems). Further note that embodiments may be associated with any number of different types of broadcast programs (e.g., sports, news, and weather programs). In addition, according to some embodiments, information related to the image adjustments may be provided back to a camera operator. For example, a signal or force feedback mechanism may help guide or limit the operator's movement of a video camera (e.g., when physical limits of a virtual model are reached).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of providing an adjustable image to be displayed on a display monitor represented in a broadcast video feed, comprising:

receiving first position information about a first position of dynamic adjustments associated with an instrumented single video camera, the video camera providing the broadcast video feed including a representation of the display monitor;

providing a first adjusted image of the adjustable image to the display monitor based on the first position information from the video camera, the first adjusted image representing a first perspective of an item in the adjustable image, the first perspective associated with the first position information as viewed by the video camera from the first position;

receiving second position information about a second position of dynamic adjustments associated with the instrumented single video camera;

providing a second adjusted image of the adjustable image to the display monitor based on the second position information from the video camera, the second adjusted image representing a second perspective of the item in the adjusted image, the second perspective associated with the second position information as viewed by the video camera from the second position;

the broadcast video feed having the representation of the display monitor which is displaying the adjustable image and having a representation of a scene separate from the representation of the display monitor; and wherein the change in the position of the video camera from the first position to the second position combined with the change in the adjustable image from the first adjusted image to the second adjusted image on the display monitor, creates an impression to a viewer watching the video feed that at least a portion of the adjustable image occupies a three-dimensional physical space.

2. The method of claim 1, wherein the instrumented video camera is adapted to provide substantially real-time information about the dynamic adjustments associated with the instrumented video camera.

3. The method of claim 1, wherein the dynamic adjustments are associated with at least one of: (i) a panning motion, (ii) a tilting motion, (iii) a focal change, (iv) a zooming adjustment, and (v) camera movement.

4. The method of claim 1, wherein the broadcast video feed is received via a high definition serial digital interface signal.

5. The method of claim 4, wherein the high definition serial digital interface signal is received via at least one of: (i) a fiber cable and (ii) a satellite transmission.

6. The method of claim 1, further comprising, when the position information of the video camera changes, automatically adjusting the image of the adjustable image on the display monitor based on the position information of the video camera to maintain the impression to the viewer watching the video feed that at least a portion of the adjustable image displayed on the display monitor occupies a three-dimensional physical space.

7. The method of claim 1, wherein the display monitor is a physical display monitor.

8. The method of claim 1, wherein the display monitor is a virtual display monitor rendered in the video feed.

9. The method of claim 1, wherein the broadcast video feed includes representations of a plurality of display monitors, and a plurality of adjustable images to be displayed on the respective display monitors are each provided with a respective adjusted image.

10. The method of claim 1, wherein the representation of the scene that is included in the video feed and separate from the representation of the display monitor comprises a representation of a news anchor that is included in the video feed and separate from the representation of the display monitor.

11. The method of claim 10, wherein the representation of the news anchor that is included in the video feed and separate from the representation of the display monitor comprises a representation of a news anchor seated at a desk;
wherein the display monitor is on or behind the desk at which the new anchor is seated; and
wherein the display monitor faces the instrumented video camera.

12. The method of claim 11, wherein the display monitor displays a sports score or scrolling news headlines;
wherein the video feed is a video feed for a television show; and
wherein the display monitor displays a name and/or logo of the television show.

13. The method of claim 1, further comprising mapping information to a tracked plane of video in a virtual environment.

14. The method of claim 13, further comprising keying, using a chroma keyer, the tracked plane of video over an encoded and delayed feed to complete the effect.

15. The method of claim 13, further comprising keying, by a switcher using a chroma keyer, the tracked plane of video over an encoded and delayed feed to complete the effect.

16. The method of claim 1, further comprising receiving information about a distance between the instrumented video camera and the display monitor.

17. The method of claim 1, wherein the providing the first adjusted image and the second adjusted image further comprises not similarly adjusting the representation of the scene that is included in the video feed and separate from the representation of the display monitor.

18. The method of claim 1, further comprising, receiving information about the adjustable image to be displayed on the display monitor represented in the broadcast video feed.

19. The method of claim 1, wherein the first position information and the second position information are from different instrumented single cameras.

20. The method of claim 1, wherein the first position information and the second position information are from the same instrumented single camera.

21. A system for providing an adjustable image to be displayed on a display monitor represented in a broadcast video feed, comprising:

an instrumented single video camera providing first position information about a first position of dynamic adjustments associated with the video camera, providing second position information about a second position of dynamic adjustments associated with the video camera, and providing the broadcast video feed including a representation of the display monitor;

a rendering engine receiving the first position information and providing a first adjusted image of the adjustable image to the display monitor based on the first position information from the video camera, the first adjusted image representing a first perspective of an item in the adjustable image, the first perspective associated with the first position information as viewed by the video camera from the first position;

the rendering engine further receiving the second position information and providing a second adjusted image of the adjustable image to the display monitor based on the second position information from the video camera, the second adjusted image representing a second perspective of the item in the adjustable image, the second perspective associated with the second position information as viewed by the video camera from the second position;

the broadcast video feed having the representation of the display monitor which is displaying the adjustable image and having a representation of a scene separate from the representation of the display monitor; and wherein the change in the position of the video camera from the first position to the second position combined with the change in the adjustable image from the first adjusted image to the second adjusted image on the display monitor, creates an impression to a viewer watching the video feed that at least a portion of the adjustable image occupies a three-dimensional physical space.

22. The system of claim 21, wherein the instrumented video camera is adapted to provide substantially real-time information about the dynamic adjustments associated with the instrumented video camera.

23. The system of claim 21, wherein the dynamic adjustments are associated with at least one of: (i) a panning motion, (ii) a tilting motion, (iii) a focal change, (iv) a zooming adjustment, and (v) camera movement.

24. The system of claim 21, wherein the display monitor is one of a physical display monitor and a virtual display monitor rendered in the video feed.

25. The system of claim 21, wherein, when the position information of the dynamic adjustments associated with an instrumented video camera changes, the image of the adjustable image is automatically adjusted by the rendering engine to maintain the impression to the viewer watching the video feed that the adjustable image displayed on the display monitor occupies a three-dimensional physical space.

26. A non-transitory, computer-readable medium storing instructions adapted to be executed by a processor to perform a method of providing an adjustable image to be displayed on a display monitor represented in a broadcast video feed, comprising:

receiving first position information about a first position of dynamic adjustments associated with an instrumented single video camera, the video camera providing the broadcast video feed including a representation of the display monitor;

providing a first adjusted image of the adjustable image to the display monitor based on the first position information from the video camera, the first adjusted image representing a first perspective of an item in the adjustable image, the first perspective associated with the first position information as viewed by the video camera from the first position;

receiving second position information about a second position of dynamic adjustments associated with the instrumented single video camera;

providing a second adjusted image of the adjustable image to the display monitor based on the second position information from the video camera, the second adjusted image representing a second perspective of the item in the adjusted image, the second perspective associated with the second position information as viewed by the video camera from the second position;

the broadcast video feed having the representation of the display monitor which is displaying the adjustable image and having a representation of a scene separate from the representation of the display monitor; and wherein the change in the position of the video camera from the first position to the second position combined with the change in the adjustable image from the first adjusted image to the second adjusted image on the display monitor, creates an impression to a viewer watching the video feed that at least a portion of the adjustable image occupies a three—dimensional physical space.

27. The medium of claim 26, wherein the instrumented video camera is adapted to provide substantially real-time information about the dynamic adjustments associated with the instrumented video camera.

28. The medium of claim 26, wherein the dynamic adjustments are associated with at least one of (i) a panning motion, (ii) a tilting motion, (iii) a focal change, (iv) a zooming adjustment, and (v) camera movement.

29. The medium of claim 26, wherein the display monitor is one of a physical display monitor and a virtual display monitor rendered in the video feed.

30. The medium of claim 26, further comprising, when the position information of the video camera changes, automatically adjusting the image of the adjustable image on the display monitor based on the position information of the video camera to maintain the impression to the viewer watching the video feed that the adjustable image displayed on the display monitor occupies a three-dimensional physical space.

* * * * *